United States Patent
Frazier et al.

(10) Patent No.: US 10,339,049 B2
(45) Date of Patent: *Jul. 2, 2019

(54) GARBAGE COLLECTION FACILITY GROUPING INFREQUENTLY ACCESSED DATA UNITS IN DESIGNATED TRANSIENT MEMORY AREA

(71) Applicant: INTERNATIONAL BUSINESS MACHINES CORPORATION, Armonk, NY (US)

(72) Inventors: Giles R. Frazier, Austin, TX (US); Michael K. Gschwind, Chappaqua, NY (US); Christian Jacobi, West Park, NY (US); Younes Manton, Toronto (CA); Anthony Saporito, Highland, NY (US); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/820,635

(22) Filed: Nov. 22, 2017

(65) Prior Publication Data

US 2018/0349274 A1    Dec. 6, 2018

Related U.S. Application Data

(63) Continuation of application No. 15/609,469, filed on May 31, 2017.

(51) Int. Cl.
*G06F 12/02*    (2006.01)
*G06F 12/0802*    (2016.01)

(52) U.S. Cl.
CPC ...... G06F 12/0261 (2013.01); G06F 12/0802 (2013.01); *G06F 2212/1044* (2013.01)

(58) Field of Classification Search
CPC ...... G06F 12/122; G06F 3/064; G06F 3/0614; G06F 2212/1044; G06F 3/0631;
(Continued)

(56) References Cited

U.S. PATENT DOCUMENTS 5,873,105 A    2/1999    Tremblay et al.
6,321,240 B1    11/2001    Chilimbi et al.
(Continued)

OTHER PUBLICATIONS

Chilimbi et al., "Making Pointer-Based Data Structures Cache Conscious", IEEE Computer Society; vol. 33; Issue 12, Dec. 2000 (14 pages).

(Continued)

*Primary Examiner* — Zhuo H Li
(74) *Attorney, Agent, or Firm* — Steven Chiu, Esq.; Kevin P. Radigan, Esq.; Heslin Rothenberg Farley & Mesiti P.C.

(57) ABSTRACT

A garbage collection facility is provided for memory management within a computer. The facility implements, in part, grouping of infrequently accessed data units in a designated transient memory area, and includes designating an area of the memory as a transient memory area and an area as a conventional memory area, and counting, for each data unit in the transient or conventional memory areas a number of accesses to the data unit. The counting provides a respective access count for each data unit. For each data unit in the transient memory area or the conventional memory area, a determination is made whether the respective access count is below a transient threshold ascertained to separate frequently accessed data units and infrequently used data units. Data units with respective access counts below the transient
(Continued)

threshold are grouped together as transient data units within the transient memory area.

9 Claims, 6 Drawing Sheets

(58) Field of Classification Search
CPC ......... G06F 12/0802; G06F 2212/1016; G06F 2212/1032; G06F 2212/7201; G06F 2212/7211; G06F 12/0261
See application file for complete search history.

(56) References Cited

U.S. PATENT DOCUMENTS

| | | | |
|---|---|---|---|
| 7,343,598 B2 | 3/2008 | Chilimbi et al. | |
| 7,930,325 B2 | 4/2011 | Siegwart et al. | |
| 2014/0281264 A1* | 9/2014 | Duluk, Jr. | G06F 12/08 711/135 |
| 2014/0324920 A1 | 10/2014 | Hamiliton et al. | |
| 2015/0234617 A1* | 8/2015 | Li | G06F 3/0647 711/114 |
| 2017/0004072 A1 | 1/2017 | Frazier et al. | |
| 2017/0004075 A1 | 1/2017 | Frazier et al. | |
| 2017/0031812 A1 | 2/2017 | Frazier et al. | |
| 2017/0031814 A1 | 2/2017 | Frazier et al. | |
| 2017/0083436 A1 | 3/2017 | Jung | |
| 2017/0322747 A1 | 11/2017 | Kumano | |

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).
International Business Machines Corporation (IBM), "z/Architecture Principles of Operation," IBM® Publication No. SA22-7832-10, Eleventh Edition, Mar. 2015, (pp. 1-1732).
International Business Machines Corporation (IBM), "Power ISA™ Version 2.07B," International Business Machines Corporation, Apr. 9, 2015, (pp. 1-1527).
Briggs et al., "Cold Object Identification in the Java Virtual Machine", arXiv:1508.04753v1; Aug. 20, 2015 (23 pages).
Fraizer et al., "Dynamic Management of Virtual Memory Blocks Exempted from Cache Memory Access", U.S. Appl. No. 15/010,658, filed Jan. 29, 2016 (56 pages).
Fraizer et al., "Garbage Collection Facility Grouping Infrequently Accessed Data Units in Designated Transient Memory Area", U.S. Appl. No. 15/609,464, filed May 31, 2017 (33 pages).
Fraizer et al., List of IBM Patents and/or Patent Applications Treated as Related, dated Nov. __, 2017 (2 pages).

* cited by examiner

GARBAGE COLLECTION FACILITY GROUPING INFREQUENTLY ACCESSED DATA UNITS IN DESIGNATED TRANSIENT MEMORY AREA

BACKGROUND

Garbage collection is an automatic memory management process that identifies data units, such as objects, in memory that are no longer being referenced and frees those objects. As memory data units, or objects, of varying sizes are allocated and later freed, the memory in which they are stored becomes increasingly fragmented. Eventually, vary few large free areas of memory exist, and it becomes difficult to store additional objects without increasing the memory size. When this occurs, a process within garbage collection, referred to as compaction, may be employed in order to consolidate the allocated objects into one large area, leaving another large area of free space available for new objects. During consolidation, the memory objects that are still being referenced are consolidated in one area of memory.

SUMMARY

Certain shortcomings of the prior art are overcome and additional advantages are provided through the provision of a computer-implemented method of managing memory. The computer-implemented method includes designating an area of a memory as a transient memory area and an area of the memory as a conventional memory area, and counting, for each data unit in the transient memory area or in the conventional memory area, a number of accesses to that data unit, the counting providing a respective access count for each data unit. The method further includes determining, for each data unit in the transient memory area or the conventional memory area, whether its respective access count is below a transient threshold ascertained to separate frequently accessed data units and infrequently accessed data units, and grouping data units with respective access counts below the transient threshold together as transient data units within the transient memory area.

Systems and computer program products relating to one or more aspects are also described and claimed herein. Further, services relating to one or more aspects may also be described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description and the specific example(s), while indicating aspects of the invention, is given by way of illustration only, and not by way of limitation. Various substitutions, modifications, additions, and/or rearrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired by a particular application, for instance, for providing garbage collection with grouping of infrequently accessed data units in a designated transient memory area.

The illustrative embodiments may be described using specific code, designs, architectures, protocols, layouts, schematics, or tools only as examples, and are not limiting to the illustrative embodiments. Furthermore, the illustrative embodiments are described in some instances using particular software, tools, and data processing environments only as an example for clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

Figure 1:
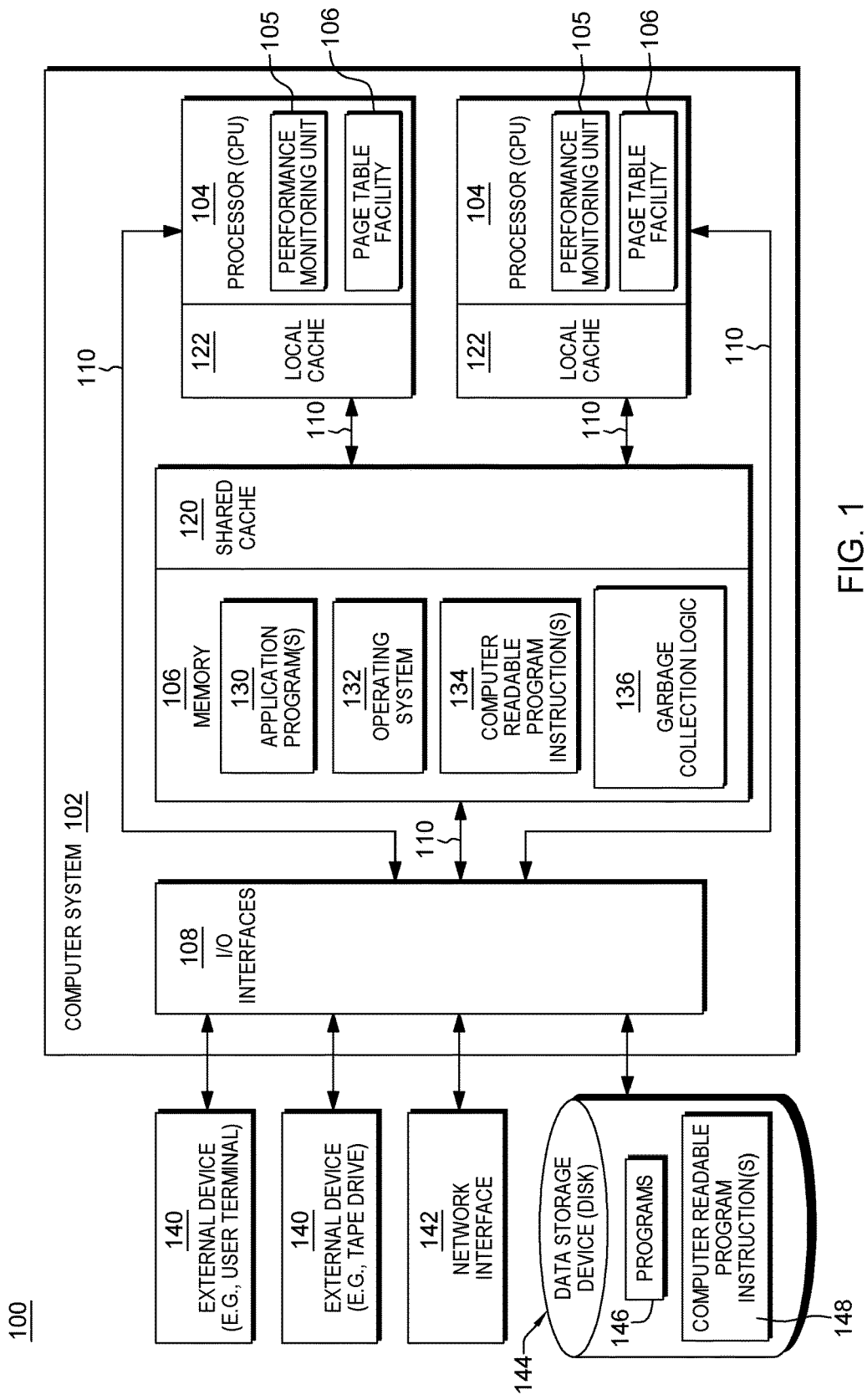
FIG. 1 depicts a block diagram of one embodiment of a data processing system which may implement processing, in accordance with one or more aspects of the present invention.

With reference to the figures, and in particular with reference to FIG. 1, an example diagram is shown of a data processing environment in which illustrative embodiments may be implemented. FIG. 1 is only an example and is not intended to assert or imply any limitation with regard to the environments in which different embodiments may be implemented. A particular implementation may make many modifications to the depicted environment based on the following description.

With reference to FIG. 1, as noted this figure depicts a block diagram of a data processing system in which one or more aspects of the present invention may be implemented. Data processing system 100 is an example of a computer, such as server, or other type of device, in which computer usable program code or instructions implementing one or more processes may be located for the illustrative embodiments.

In one example, data processing system 100 may be based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. z/ARCHITECTURE is a registered trademark of International Business Machines Corporation, Armonk, N.Y., USA.

In another example, the processing system may be based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The data processing system may also be based on other architectures, including, but not limited to, the Intel x86 architectures. Other examples also exist.

As shown in FIG. 1, data processing system 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Processor 104 includes a plurality of functional components used to execute instructions. These functional components include, for instance, an instruction fetch component to fetch instructions to be executed; an instruction decode unit to decode the fetched instructions and to obtain operands of the decoded instructions; instruction execution components to execute the decoded instructions; a memory access component to access memory for instruction execution, if necessary; and a write back component to provide the results of the executed instructions.

In addition, processor 104 includes, in one or more embodiments, a performance monitoring unit 105, as well as a page table facility 106, which may be used in connection with one or more implementations of grouping infrequently accessed data units in a designated transient memory area, as discussed herein.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, an operating system 132, and one or more computer readable program instructions 134, as well as garbage collection processing logic 136, with grouping of infrequently accessed data units in a designated transient memory area, such as disclosed herein. Additionally, or alternatively computer readable program instructions 134 may be configured to carry out one or more other functions of certain embodiments of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of one or more aspects of the present invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As noted, the depicted example in FIG. 1, and discussed above, is not meant to imply architectural limitations. For instance, data processing system 100 of FIG. 1 could also be a server, workstation, tablet computer, laptop computer, or other device.

Computer processors typically operate at far higher clock speeds than main memory. To compensate, modern processors employ caches, which are fast local memory banks most often organized in a hierarchy, that aim to hold the most frequently accessed items in main memory. Caches are typically far faster than main memory, but also far smaller. As such, caches are a precious resource. The processes that govern which parts of main memory are held in the cache hierarchy are complex, but can be summarized as seeking to place in cache the data most recently accessed from main memory on the assumption that recently accessed data will be accessed again in the near future. This is temporal locality. Cache processes also seek to place in cache data that is near the data most recently accessed in main memory, on the assumption that data near the most recently accessed data will be accessed in the near future also. This is spatial locality. Given that the cache is a limited resource and usually cannot contain all of the data a program will access, data that is newly stored in cache will need to supplant previous data. Most cache processes therefore choose to supplant the least recently accessed data in order to make room for the most recently accessed data and adjacent data.

Given that cache processes seek to take advantage of expected temporal and spatial locality, the lack of temporal and/or spatial locality results in wasting space in the cache hierarchy by storing data that will likely not be accessed again in the near future and supplanting data that may still be accessed in the near future. As such, optimizing a software program to best make use of the cache hierarchy involves attempting to access and operate on small collections of data at any given time and grouping related data closer together. This, however, is not always possible; programs may need to access large collections of data and/or data that is not grouped together, to the detriment of performance. Programs may occasionally also need to access data that is infrequently accessed due to a temporary condition that may shortly subside; accessing this data has the secondary effect of likely supplanting frequently accessed data from the cache, such that when the temporary condition subsides and the program returns to accessing the previous data, the data will no longer be in cache, thereby effectively doubling the detrimental performance effects of having to access main memory to retrieve the data.

As described herein, modern processors offer the program a chance to provide hints to the caching processes regarding the nature of the data being accessed, by providing transient or temporal access instructions and other methods of identifying transient data. Using these instructions and methods to access data indicates to the processor that the data being accessed will likely not be accessed in the near future, allowing the processor to decline storing the data in all or parts of the cache hierarchy, and thereby preserving some or all of the existing data that would otherwise be supplanted. It then becomes the responsibility of the user or program to effectively identify transient data in order to take advantage of such facilities.

In programming languages that feature automatic memory management, commonly referred to as garbage collection (GC), a typical GC process, as part of its functionality, will periodically scan all data relevant to a running program and possibly move some data. As such, garbage collectors are in a position to optimize for spatial locality by grouping frequently accessed data units together and infrequently accessed units together as well. In the Java programming language, the primary aggregate data unit subject to garbage collection is referred to as an "object", which is alternately discussed herein by way of example only.

As described herein, the garbage collector may optimize for spatial locality by grouping infrequently accessed objects in main memory together in an area of the main memory designated for transient access by the processor by, for instance, designating a first memory area of main memory as containing conventional objects, and a second area of memory as containing transient objects. In operation, the number of accesses to each data unit or object may be counted, and used to dynamically determine a threshold (for a particular garbage collection cycle) that separates infrequently accessed objects from frequently accessed objects. The infrequently accessed objects may then be grouped in the transient memory area as transient memory objects.

Generally stated, disclosed herein are computer program products, systems and computer-implemented methods of managing memory. The disclosed facility includes designating (or allocating) an area of a memory as a transient memory area and an area of the memory as a conventional memory area. For each data unit in the transient or conventional memory areas, a number of accesses to the data unit are counted, with the counting providing a respective access count for each data unit. For each data unit in the transient memory area or the conventional memory area, a determination is made whether the respective access count is below a transient threshold ascertained to separate frequently accessed data units and infrequently accessed data units. Data units with respective access counts below the transient threshold are grouped together as transient data units within the transient memory area. In one or more embodiments, the determining and grouping occur in association with performing garbage collection processing on the conventional memory area and the transient memory area.

In one or more embodiments, the facility further determines the transient threshold based, at least in part, on the respective access counts. This determining of the transient threshold may include, for instance, identifying from the respective access counts to the data units within the conventional memory area and the transient memory area, a first quartile (Q1), a third quartile (Q3), and inter-quartile range (IQR=Q3−Q1) of access counts, and establishing the transient threshold as Q1−X×IQR, where X is a specified value, such as 1.5.

In one or more implementations, the grouping may include moving any data unit within the transient memory area with a respective access count above the transient threshold from the transient memory area to the conventional memory area, and moving any data unit within the conventional memory area with a respective access count below the transient threshold from the conventional memory area to the transient memory area.

In one or more embodiments, the performing garbage collection processing may include performing a current garbage collection processing cycle, and the method may further include resetting the respective access counts for the data units with completing of the current garbage collection processing cycle. In other embodiments, the method may include decaying the respective access counts for the data units with completing of the current garbage collection processing cycle. The decayed respective access counts from the current garbage cycle may thus be used to affect the respective access counts for a next garbage collection processing cycle.

In one or more implementations, the memory is main memory, and the transient memory area is a contiguous memory area of the main memory. Further, grouping of data units below the transient threshold together as transient data units within the transient memory area facilitates treating the transient data units differently by a processor accessing the transient memory area than the data units in the conventional memory area to enhance performance of an associated processor cache hierarchy, as explained further herein.

In one or more specific implementations, garbage collection processing with grouping of infrequently accessed data units in a transient memory area may make use of a dedicated instruction used to load a value from memory into a processor's working registers, which functions similar to a conventional load instruction that can be used to load the address of an object into a register to facilitate subsequent loading data contained in that object. This second, seemingly redundant load instruction may be used to allow the processor to distinguish the loading of addresses to objects that will participate in the garbage collection processing described herein from the loading of other data that is not subject to the garbage collection processing.

In one or more embodiments, a mechanism may also be employed for determining the frequency of objects or data units by way of a performance monitoring unit 105 (FIG. 1) in the processor that is able to count every execution of the dedicated instruction noted above, and identify the particular object or data unit being accessed. In particular, a mechanism may be incorporated into a processor's performance monitoring unit (PMU) as a piece of hardware in the processor dedicated to counting events of interest during program execution. The PMU can be programmed to count every occurrence of an event or multiples thereof, and may also be programmed to signal the program once a particular count has been reached. For the purposes of this approach, the PMU might count every $N^{th}$ execution of the dedicated load instruction specified above, and signal the program, allowing the program to capture the address being loaded by the dedicated instruction. Since the address being loaded corresponds to an object or data unit of interest to this memory management processing, an object that was previously given a counter, the program can then increment the counter of this object. In this way, the program can increment the access counts of all objects being accessed, at a configurable granularity, and use the resulting data to determine which objects classify as frequently accessed or infrequently accessed.

In one or more embodiments, designating a portion of the memory, e.g., main memory, as containing transient data units may be achieved using the processor's page table facility 106 (FIG. 1). As known, the page table is a hardware data structure that communicates to the processor the properties of memory used by the running program. Typically, memory is divided into pages, and for each page of memory, a page table entry is maintained by the program to indicate various properties, such as whether the page is readable and/or writable, whether it should be protected in some manner, encrypted, etc. In accordance with one or more aspects of the present invention, the page table may be updated with a property that defines whether the memory is to be used to hold transient data, thereby allowing the processor to know when executing load and store instructions, whether the data being loaded or stored is expected to be used again in the near future, and allowing the process to decide whether or not to also store the data in its cache hierarchy, as discussed further herein.

Figure 2:
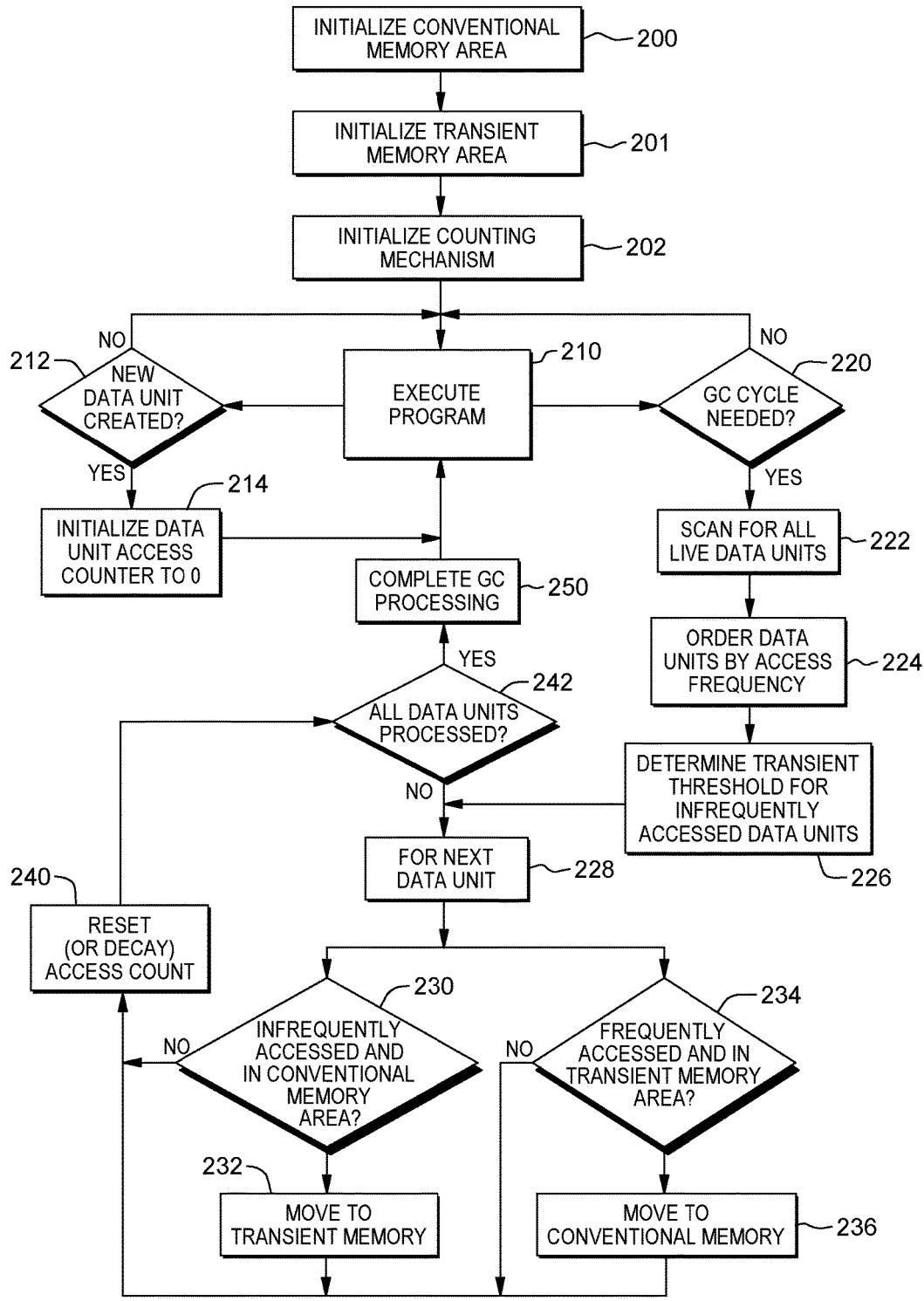
FIG. 2 depicts one embodiment of a garbage collection process which includes grouping infrequently accessed data units in a designated transient memory area, in accordance with one or more aspects of the present invention.

One embodiment of processing in accordance with one or more aspects of the present invention is depicted in FIG. 2, by way of example only. As disclosed herein, garbage collection processing is provided which allows the garbage collector, in the course of its functionality of moving objects or data units, to also group infrequently accessed objects together in an area of memory designated as containing transient data units. To accomplish this, a conventional memory area (e.g., conventional object heap) is initialized 200, as is a transient memory area (e.g., transient object heap) 201. A counting mechanism is initialized, such as the above-noted performance monitoring unit (PMU) within the processor 202. For instance, in one or more implementations, a counter may be allocated for each data unit or object in the program, which will hold a count of the number of times that data unit has been accessed by the program since some arbitrary starting point in time. For instance, in one or more embodiments, the starting point in time may be since a last garbage collection cycle. In one or more embodiments, the counter may be allocated in the memory word immediately preceding the start of the data unit, such that for each data unit, the counter will be at a known offset, regardless of the data unit's size and shape.

A program executes 210, during which a new data unit may be created 212, and this process will include initializing the data unit's access counter to zero 214. Accesses to data unit (or object) pointers may be performed via a dedicated instruction, such as noted above. The counting mechanism may be initialized such that for every $N^{th}$ object accessed by the application, the counter for the data unit being accessed will be incremented. At some point in time, a garbage collection cycle is needed 220, which will result in the garbage collector pausing the program or application, and initiating the garbage collection cycle. In one or more embodiments, a garbage collection cycle may be initiated when the allocated main memory (conventional and transient regions) becomes full, or when needed by the program executing. The garbage collector scans for live data units 222, that is, data units that are relevant or needed by the program. Upon a scan of data units relevant to the program, the garbage collector has available to it a histogram representing frequency of access of data units in the program since some time T (e.g., since a last garbage collection cycle completed). With this information, the garbage collector may determine if there are any data units that qualify as "accessed infrequently" in the allocated areas of main memory. In one or more implementations, this may be accomplished by ordering the data units based on access frequency 224, and determining a transient threshold for infrequently accessed data units 226 of this cycle. The infrequently accessed data units are outliers, based on frequency of access. Outliers with a large magnitude are not of interest since they represent data units being used more frequently, while outliers with a small magnitude are expressively of interest, since they represent data units that are infrequently accessed.

For the data units in the allocated conventional memory area and transient memory area 228, processing determines whether an infrequently accessed data unit is in the conventional memory area 230 and if "yes", moves that data unit to the transient memory area 232. Similarly, processing determines whether a frequently accessed data unit is in the transient memory area 234, and if "yes", moves that data unit to the conventional memory area 236. Processing then resets, or decays, the access count for the respective data unit or object 240, and determines whether all data units in the allocated conventional and transient memory areas have been processed 242. If so, garbage collection processing completes 250, and program execution continues 210.

By way of further example, in order to determine which data units are outliers of interest, the data units may be ordered by frequency of access. Using the access counts, the first quartile (Q1), the third quartile (Q3), and the interquartile range (IQR=Q3−Q1) may be identified. A transient threshold or cutoff frequency (Q1−X×IQR) may be determined, such that frequencies below this cutoff frequency are outliers that represent infrequently accessed data units. For exemplary purposes X may be specified value, such as X=1.5.

As a further example, for objects $0_1 \ldots 0_n$ with access counts $C_1 \ldots C_n$, where $C_1 \leq C_2 \leq \ldots C_n$, the first and third quartiles may be determined as:

$Q1 = (C_{floor(n \div 4)} + C_{ceil(n \div 4)}) \div 2$ $Q3 = (C_{floor(n \times 3 \div 4)} + C_{ceil(n \times 3 \div 4)}) \div 2$ $IQR = Q3 - Q1$ $Threshold = Q1 - X \times IQR$ Alternatively, Q1 can be determined as either $Q1 = C_{floor(n \div 4)}$ or $Q1 = C_{ceil(n \div 4)}$ Similarly, Q3 can be determined as either $Q3 = C_{floor(n \times 3 \div 4)}$ or $Q3 = C_{ceil(n \times 3 \div 4)}$ Note again that X is a scale factor, which in one example might be 1.5. The "threshold" is a transient threshold and represents a cutoff frequency of access for the particular garbage collection cycle, and may be used for determining which data units can be considered infrequently accessed and moved or retrained in the transient memory area, as described herein.

Subsequent to this threshold determination, the GC may move all infrequently accessed data units or objects to a contiguous area of memory designated as containing transient data. Any objects already inhabiting that memory area, by way of an earlier GC scan, who's access frequencies are no longer below $Q1-X \times IQR$ will be moved to the conventional area of memory. As mentioned, in one or more embodiments, the transient threshold described herein is determined for each garbage collection cycle based on the accumulated count of accesses to the data units in the allocated conventional and transient memory areas at the time of that GC cycle. Also as noted, the counts may be reset at the end of each garbage collection cycle, or a decay function could be used so that an access count in one cycle affects the totals in another cycle, depending on the desired implementation.

Figure 3A:
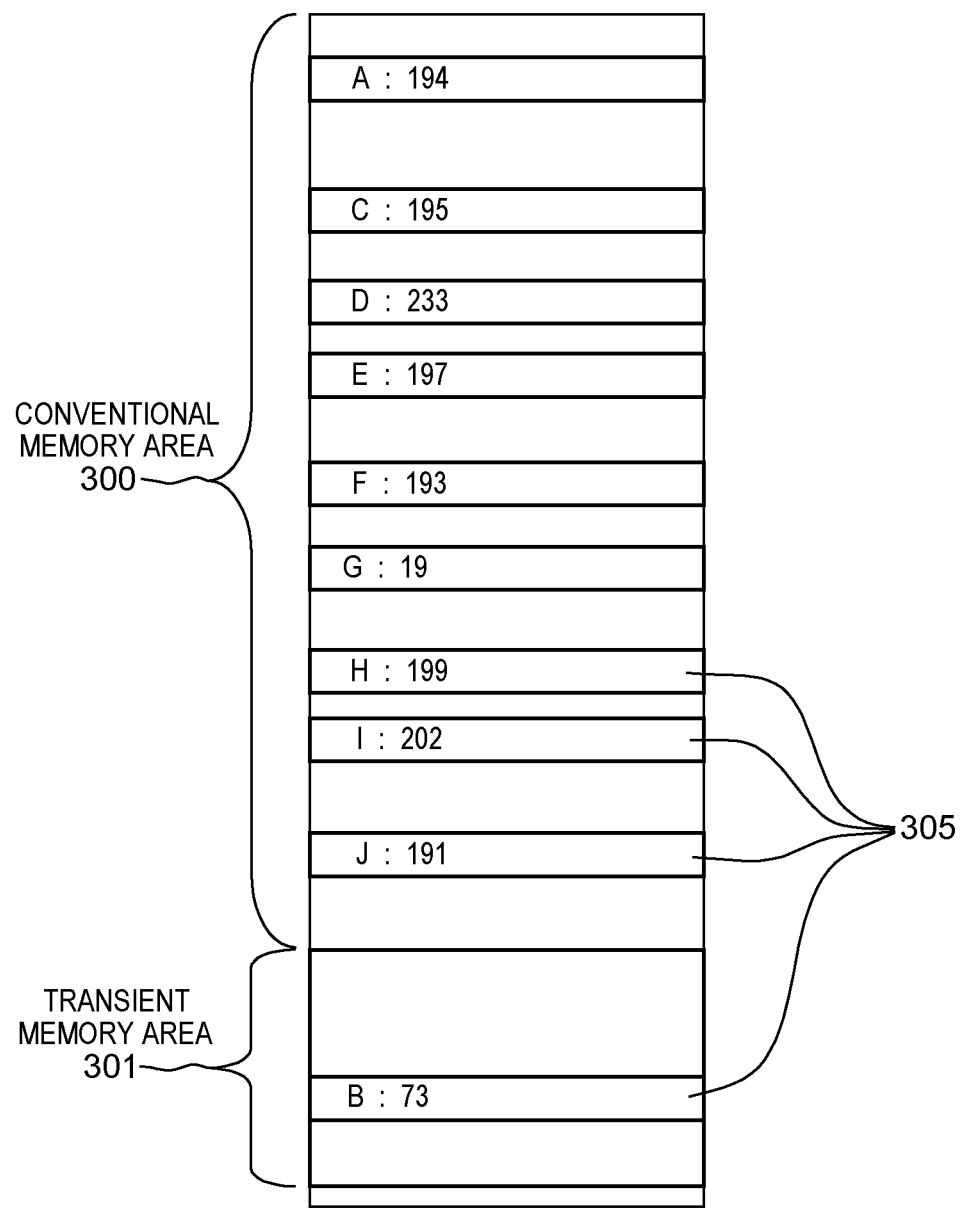
FIGS. 3A & 3B depict an example of an initialized conventional memory area and transient memory area, which contain data units which are being grouped during garbage collection based on observed access frequency, in accordance with one or more aspects of the present invention.

As one detailed example, FIG. 3A shows 10 objects 305 labeled A-J, and their associated access frequencies, as well as allocated memory area, designated as conventional memory area 300, and transient memory area 301.

Ordering the access frequencies from smallest to largest results in the following: 19, 73, 191, 193, 194, 195, 197, 199, 202, 233.

Q1 is the access frequency of the object that divides the first and second quarters of the set. If no single object satisfies this criteria the object before or after can be chosen as the dividing point, or an average of the frequencies of the two objects that straddle the dividing point may be taken.

$Q1 = (73+191)/2 = 132$

Q3, similarly, is the access frequency of the object that divides the third and fourth quarters of the set.

$Q3 = (199+202)/2 = 200.5$

The inter-quartile range is the difference between Q3 and Q1.

$IQR = Q3 - Q1 = 200.5 - 132 = 68.5$

Processing then establishes $X \times IQR$, where $X=1.5$ for exemplary purposes only. Note that this value may be adjusted to control the threshold or cutoff frequency, as desired.

$1.5 \times IQR = 102.75$

The cutoff frequency or transient threshold is then the difference between Q1 and $1.5 \times IQR$. $Threshold = Q1 - 1.5 \times IQR = 29.25$.

Therefore, all objects accessed less than 29.25 times are infrequently accessed in this cycle, and will be moved to the transient memory area, while all objects more than 29.25 times should be moved to or remain in the conventional memory area.

Figure 3B:
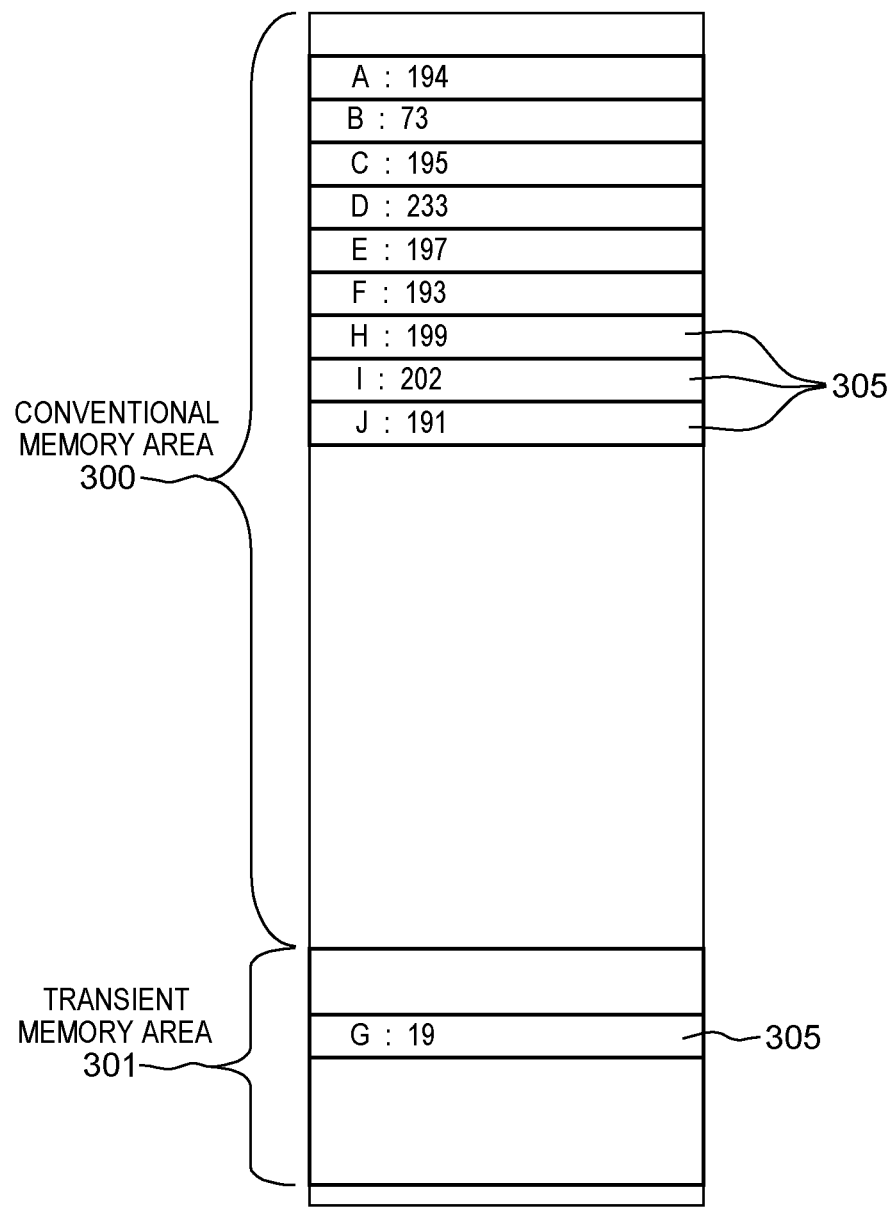

FIG. 3B. shows the resulting memory contents after applying the GC method described above.

As noted, in one or more embodiments, the GC may reset the access frequencies for all objects to 0 upon completion of the processing, thereby preventing previous accesses from influencing the GC in subsequent scans.

In another embodiment the GC may apply a decay function to the frequencies, thereby allowing previous accesses to (e.g., weakly) influence the GC in subsequent scans. The decay function can be used to reduce any oscillation, where an object is moved in and out of the transient memory area due to the application access patterns behaving in a cyclical manner, for example.

Advantageously, by segregating infrequently accessed data units or objects in their own memory area, apart from other data units, the spatial locality of the program's data is improved. This results in better utilization of a processor's cache hierarchy, since existing processor cache algorithms assume that once a piece of data is accessed, the program will likely access adjacent pieces of data in the near future. Since infrequently accessed objects are no longer interspersed with more frequently accessed data, it is insured that the infrequently accessed data does not pollute the cache as often as it otherwise would by virtue of coincidentally being located adjacent to infrequently accessed data.

Going forward however, by segregating infrequently used data in an area of memory marked as transient, the present invention further improves cache utilization by allowing the processor to forego caching that data completely. In the course of executing load and store instructions, the processor has enough information to know whether or not the data being loaded or stored resides in memory marked as transient, and can, at a very granular level, elect not to maintain data loaded from or stored to transient memory to the same extent as other data in its cache hierarchy. This insures that infrequently accessed data does not occupy the cache at all, or at least at a minimized level, and allows more frequently accessed data to take its place.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
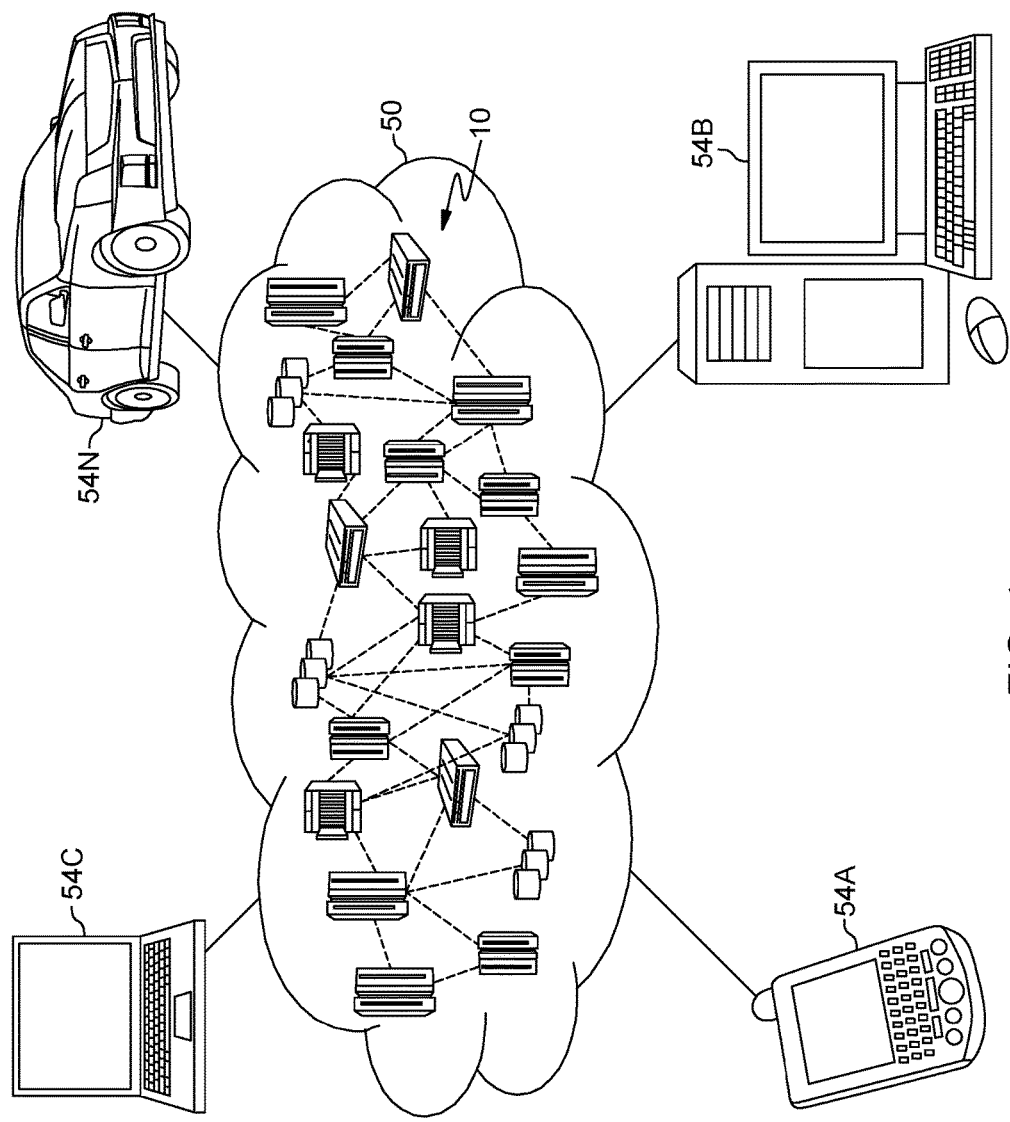
FIG. 4 depicts one embodiment of a cloud computing environment which may facilitate implementing, or be used in association with, one or more aspects of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 5:
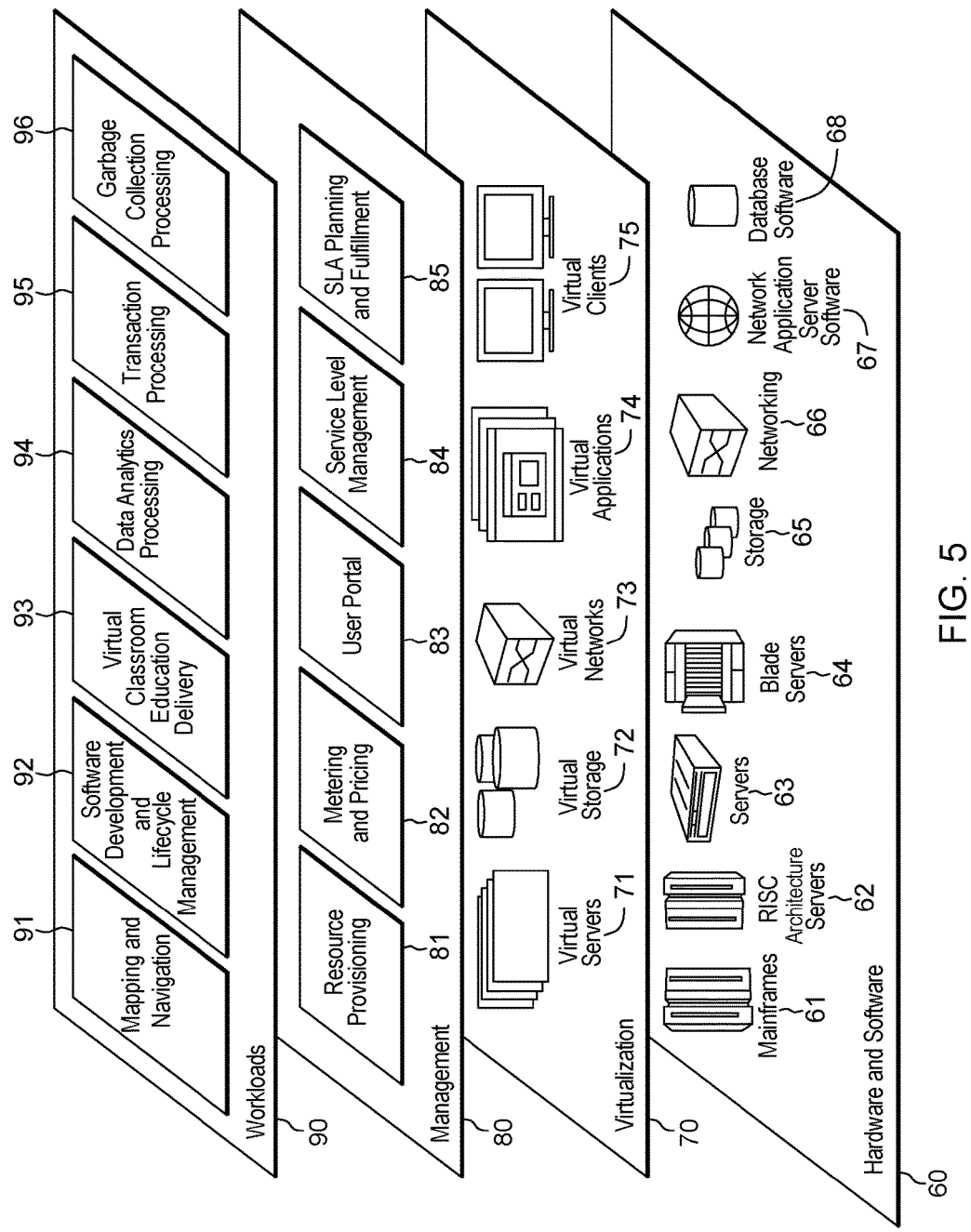
FIG. 5 depicts an example of extraction model layers, which may facilitate implementing garbage collection processing, in accordance with one or more aspects of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and garbage collection processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used, if desired.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of managing memory, the method comprising:
executing a memory management process within a computing environment, the executing the memory management process comprising:
establishing an area of a memory as a transient memory area and an area of the memory as a conventional memory area;
tracking, for each data unit in the transient memory area or the conventional memory area, a number of accesses to the data unit, the tracking providing a respective access count for each data unit;
performing garbage collection processing on the memory, the garbage collection processing facilitating consolidation of the data units within the transient memory area or the conventional memory area, and the garbage collection processing comprising:
determining, for each data unit in the transient memory area or the conventional memory area, whether the respective access count is below a transient threshold ascertained to separate frequently accessed data units and infrequently accessed data units; and
grouping data units with respective access counts below the transient threshold together as transient data units within the transient memory area;
repeating the garbage collection processing over multiple garbage collection processing cycles; and
applying, between one garbage collection processing cycle and another garbage collection processing cycle of the multiple garbage collection processing cycles, an adjustment to lower, at least in part, the respective access counts of the data units to facilitate the garbage collection processing on the memory.

2. The computer-implemented method of claim 1, further comprising determining the transient threshold based, at least in part, on the respective access counts.

3. The computer-implemented method of claim 2, wherein determining the transient threshold includes identifying from the respective access counts of the data units within the conventional memory area and the transient memory area, a first quartile (Q1), a third quartile (Q3), and an inter-quartile range (IQR=Q3−Q1) of access counts, and establishing the transient threshold as Q1−X×IQR, where X is a specified value.

4. The computer-implemented method of claim 1, wherein the grouping comprises moving any data unit within the transient memory area with a respective access count above the transient threshold from the transient memory area to the conventional memory area.

5. The computer-implemented method of claim 1, wherein the grouping comprises moving any data unit within the conventional memory area with a respective access count below the transient threshold from the conventional memory area to the transient memory area.

6. The computer-implemented method of claim 1, wherein the performing garbage collection processing comprises performing a current garbage collection processing cycle, and the method further comprises resetting the respective access counts for the data units with completing of the current garbage collection processing cycle.

7. The computer-implemented method of claim 1, wherein the performing garbage collection processing comprises performing a current garbage collection processing cycle, and the method further comprises decaying the respective access counts for the data units with completing of the current garbage collection processing cycle, wherein the decayed respective access counts processed in the current garbage collection processing cycle effect the respective access counts for a next garbage collection processing cycle.

8. The computer-implemented method of claim 1, wherein the memory is main memory and the transient memory area is a contiguous memory area of the main memory.

9. The computer-implemented method of claim 1, wherein grouping of data units below the transient threshold together as transient data units within the transient memory area facilitates treating the transient data units differently by a processor accessing the transient memory area than data units in the conventional memory area to enhance performance of an associated cache hierarchy.

\* \* \* \* \*